(12) United States Patent
Peng

(10) Patent No.: US 9,456,479 B1
(45) Date of Patent: Sep. 27, 2016

(54) ONLINE KNOB DIMMING SWITCH

(71) Applicant: Rich Brand Industries Limited, Dongguan, Guangdong Province (CN)

(72) Inventor: Te-Shui Peng, Taoyuan (TW)

(73) Assignee: Rich Brand Industries Limited, Dongguan (CN)

( * ) Notice: Subject to any disclaimer, the term of this patent is extended or adjusted under 35 U.S.C. 154(b) by 0 days.

(21) Appl. No.: 14/872,424

(22) Filed: Oct. 1, 2015

(51) Int. Cl.
 *H05B 37/02* (2006.01)
 *H01H 19/00* (2006.01)
 *H05B 33/08* (2006.01)

(52) U.S. Cl.
 CPC ................. *H05B 33/0845* (2013.01)

(58) Field of Classification Search
 CPC . H05B 33/0845; H01H 19/001; H01H 19/14

USPC ........ 315/291, 224; 200/19.07, 19.11, 19.18, 200/19.19, 336; 362/375, 374; D13/158, D13/162, 123

See application file for complete search history.

(56) References Cited

U.S. PATENT DOCUMENTS 3,385,944 A * 5/1968 Mackiewicz .......... H01C 10/36
174/66

* cited by examiner

*Primary Examiner* — Daniel D Chang
(74) *Attorney, Agent, or Firm* — Alan D. Kamrath; Kamrath IP Lawfirm, P.A.

(57) ABSTRACT

An online knob dimming switch includes a printed circuit board, and a switch and a dimming circuit installed in the online knob dimming switch and operated with a dimmable energy-saving fluorescent bulb and a dimmable LED bulb, so that the online knob dimming switch may adjust the light emitting brightness of the dimmable energy-saving fluorescent bulb and dimmable LED bulb installed onto a lampholder. With the wire holders installed at both ends, a power cable is installed conveniently to achieve the effects of shortening the assembling procedure, and improving the assembling efficiency and the market competitiveness.

8 Claims, 7 Drawing Sheets

ONLINE KNOB DIMMING SWITCH

TECHNICAL FIELD

The technical field relates to an online knob dimming switch, and more particularly to the online knob dimming switch capable of dimming a dimmable energy-saving fluorescent bulb and a dimmable LED bulb installed to a lampholder and connecting an electric wire conveniently to achieve the effects of shortening the assembling procedure, and improving the assembling efficiency and the market competitiveness.

BACKGROUND

Lamp is one of the necessary electric appliances in our life and mainly used for providing light, and various common lamps include table lamps, nightlights, fluorescent lamps, etc. A common conventional lamp is comprised of a lamp body and an online switch connected to the lamp, and the online switch may be turned, pressed or pushed to turn ON and OFF the lamp, so that a light emitting element installed in the lamp is lit or extinguished. In other words, the early conventional online switch just has the function of turning ON and OFF the current, but it cannot adjust the brightness of the light emitting element of the lamp. With the advent of the diversification of people's life, users have different light emitting brightness requirements on the lampholder. To cope with the market requirements, online dimming switch is developed and sold in the market, and such online dimming switch is provided for adjusting the light emitting brightness of the bulb of the lamp, but the conventional online dimming switch is operated by turning a knob to adjust and change the property (such as the resistance) of a passing current, so as to adjust the intensity of the bright of the lamp. Therefore, the conventional online dimming switch is only applicable for an incandescent bulb of higher power consumption and inapplicable for an energy-saving fluorescent bulb or LED bulb with higher brightness and better energy saving effect.

As science and technology advance, various light emitting elements are developed and a dimmable energy-saving fluorescent bulb and a dimmable LED bulb are introduced to the market. The energy-saving fluorescent bulb and LED bulb also come with a mechanism for changing the brightness, but the aforementioned conventional online knob dimming switch cannot be used together with the high-tech dimmable energy-saving fluorescent bulb and dimmable LED bulb, so that it is necessary to design and develop an online knob dimming switch for the dimmable energy-saving fluorescent bulb and the dimmable LED bulb to expand the scope of applicability and meet the requirement of consumers.

In addition, the conventional online switch or online knob dimming switch generally comprises a base, a cover and an electrical connecting module installed therein. When the power cable is installed, it is necessary to loosen the bold to remove the cover from the base, and then both ends of the power cable are processed into bare ends, extended into the base, and screwed with the electrical connecting module by a bold or soldered with the electric connecting module by a solder gun, and then the cover is covered onto the base, and the bold is locked to complete the operation of connecting the electric wire. Obviously, the aforementioned operation of connecting the electric wire is cumbersome, and thus resulting in a low assembling efficiency which is unfavorable to the improvement of the market competitiveness.

SUMMARY

Therefore, it is a primary objective of this disclosure to provide an online knob dimming switch capable of directly dimming a dimmable energy-saving fluorescent bulb and a dimmable LED bulb connected to a lampholder.

Another objective of this disclosure is to provide an online knob dimming switch capable of connecting an electric wire conveniently to achieve the effects of shorting the assembling procedure, and improving the assembling efficiency and the market competitiveness.

To achieve the aforementioned and other objectives, this disclosure provide an online knob dimming switch comprising a base, a cover, a printed circuit board and a plurality of wire holders, characterized in that the base is a casing with a hollow formed at the top of the base, a large accommodating space formed inside the base, a pivoting frame formed separately at left and right ends of the base, an accommodating space penetrating from top to bottom in the pivoting frame and passing out from an outer side of the base, a separating ridge formed at the center of a surface of an inner sidewall member and extended from top to bottom, a retaining slot formed separately on both sides, a latching ridge transversally disposed on an outer surface of the outer sidewall member, and a pivoting slot formed at the bottom edge of the inner sidewall member; the cover is a casing with a hollow formed at the bottom of the cover and covered and engaged with the base, and a large accommodating space is formed therein, and a partition wall is formed at a position separately and slightly closer to the left and right ends, and a separating ridge outwardly extended from the center of an outer side of the partition wall, an installing notch formed on an end surface of the left and right ends of the cover separately, and the printed circuit board has a switch and dimming circuit and a knob installed thereon, and the switch and the dimming circuit are electrically coupled from the knob, and the knob is disposed at a position higher than the printed circuit board, and the outer edge of the knob is protruded further than an edge of the printed circuit board, and an accommodating recess is formed at the left and right ends of the printed circuit board and large enough to frame the pivoting frame on both sides of the base, and a conductive plate is installed above the accommodating recess and electrically coupled between the switch and the dimming circuit, and a conductive tip is formed and extended outwardly from an inner side of the conductive plate, and a conductive sharp-claw plate is formed at the top of the conductive tip; the printed circuit board is installed horizontally into the large accommodating space of the base, and the accommodating recesses on both sides frame the pivoting frames on both sides of the base respectively, and the conductive plates are inserted into the corresponding retaining slots for positioning, and the separating ridge separates the two conductive plates disposed on the same side, and an outer edge of the knob is disposed at the top of the positioning plate risen from the base; and the plurality of wire holders with a quantity of two are installed symmetrically sideway, and a pivoting shaft is extended out from the inner side of the bottom wall of each wire holder towards both sides to enter into the pivoting slot of the base to define a pivoting status, and an inner sidewall member is disposed at the top of the pivoting shaft and has an upper assistant pressing plate and a lower assistant pressing plate disposed at upper and lower positions of an inner side of the inner sidewall member; an outer sidewall member is extended upwardly from an outer side of the bottom wall and has an inner edge as a latching edge; a block is coupled between the inner sidewall member and the outer sidewall member and an insert hole is formed and penetrated between the inner sidewall member and the outer sidewall member; and a separating ridge is formed on an inner side of the insert hole.

In the online knob dimming switch, the base has a through hole formed at each of the four corners of the base and penetrated from top to bottom for passing the engaging member from bottom to top, and a stepped surface with the height on the inner side greater than the height on the outer side and formed at the periphery of the base, and a positioning plate risen from the base; a locking hole pillar having a hollow facing downward and an inner thread formed therein is disposed at each of the four corners of the cover, the locking hole pillar is configured to be corresponsive to the through hole of the base and has a stepped surface with the height on the outer side greater than the height on the inner side and formed at the periphery and configured to be corresponsive to the base, and a hollow positioning slot is formed at a position corresponsive to the positioning plate of the base, and the cover includes a plurality of positioning pillars disposed therein; and the stepped surface of the cover is configured to be corresponsive to the stepped surface of the base, while the positioning slot of the cover is configured to be corresponsive to the positioning plate of the base, and the locking hole pillar of the cover is configured to be corresponsive to the through hole of the base, and the installing notch of the cover is configured to be corresponsive to the outer sidewall member to cover and engage with the base, so that a portion of the knob is protruded from the range of engaging the cover and the base, while the positioning pillar disposed in the cover abuts a surface of the printed circuit board for positioning, and then the engaging members are passed from bottom to top through the through hole of the base and locked with the locking hole pillar of the cover.

In the online knob dimming switch, the base has a plurality of upwardly protruding support pillars, and when the printed circuit board is horizontally placed into the large accommodating space of the base, the bottom side of the printed circuit board sits on the support pillars stably for positioning.

In the online knob dimming switch, the pivoting shaft of the wire holder has a bevel to facilitate entering the base into a pivoting slot of the base by a rotary motion pivoting slot.

In the online knob dimming switch, the assistant pressing plate of the wire holder has a limit plate disposed separately on both sides of the assisting pressing plate.

In the online knob dimming switch, the inner top edge of the outer sidewall member of the wire holder is formed to be a bevel and a though hole is formed at the bottom of the wire holder.

In the online knob dimming switch, the latching edge on the outer sidewall member of the wire holder is formed at the inner top edge of the through hole.

In the online knob dimming switch, the insert hole of the wire holder has a separating ridge formed on an inner surface of the insert hole and an outermost distal head formed to be a bevel.

DETAILED DESCRIPTION OF THE PREFERRED EMBODIMENTS

Figure 1:
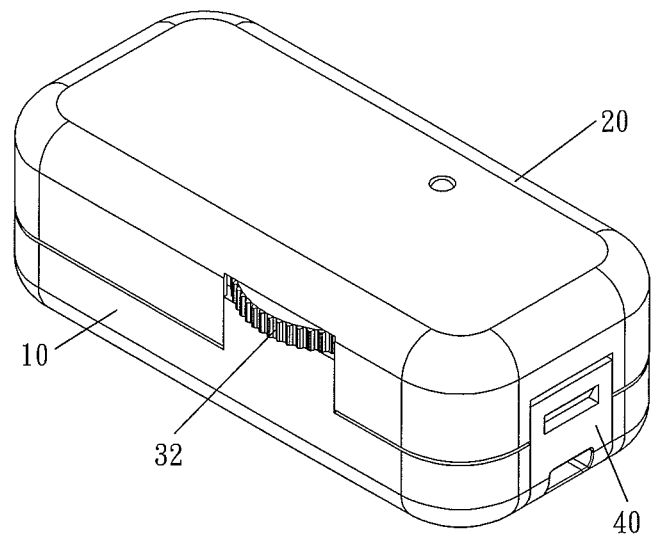
FIG. 1 is a top view of a preferred embodiment of this disclosure.
Figure 2:
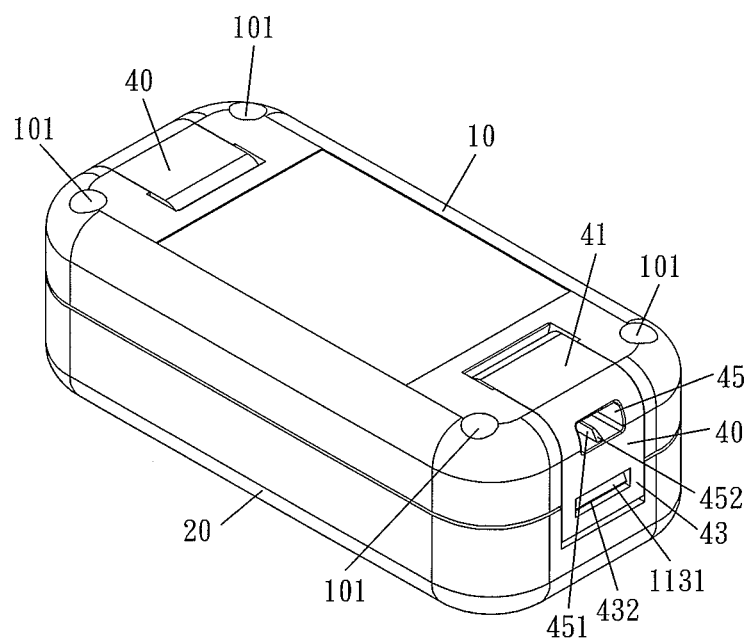
FIG. 2 is a bottom view of a preferred embodiment of this disclosure.

This disclosure will become clearer in light of the following detailed description of an illustrative embodiment of this invention described in connection with the drawings.

In a preferred embodiment of this disclosure, an online knob dimming switch 1 comprises a base 10, a cover 20, a printed circuit board 30 and a plurality of wire holders 40.

Figure 3:
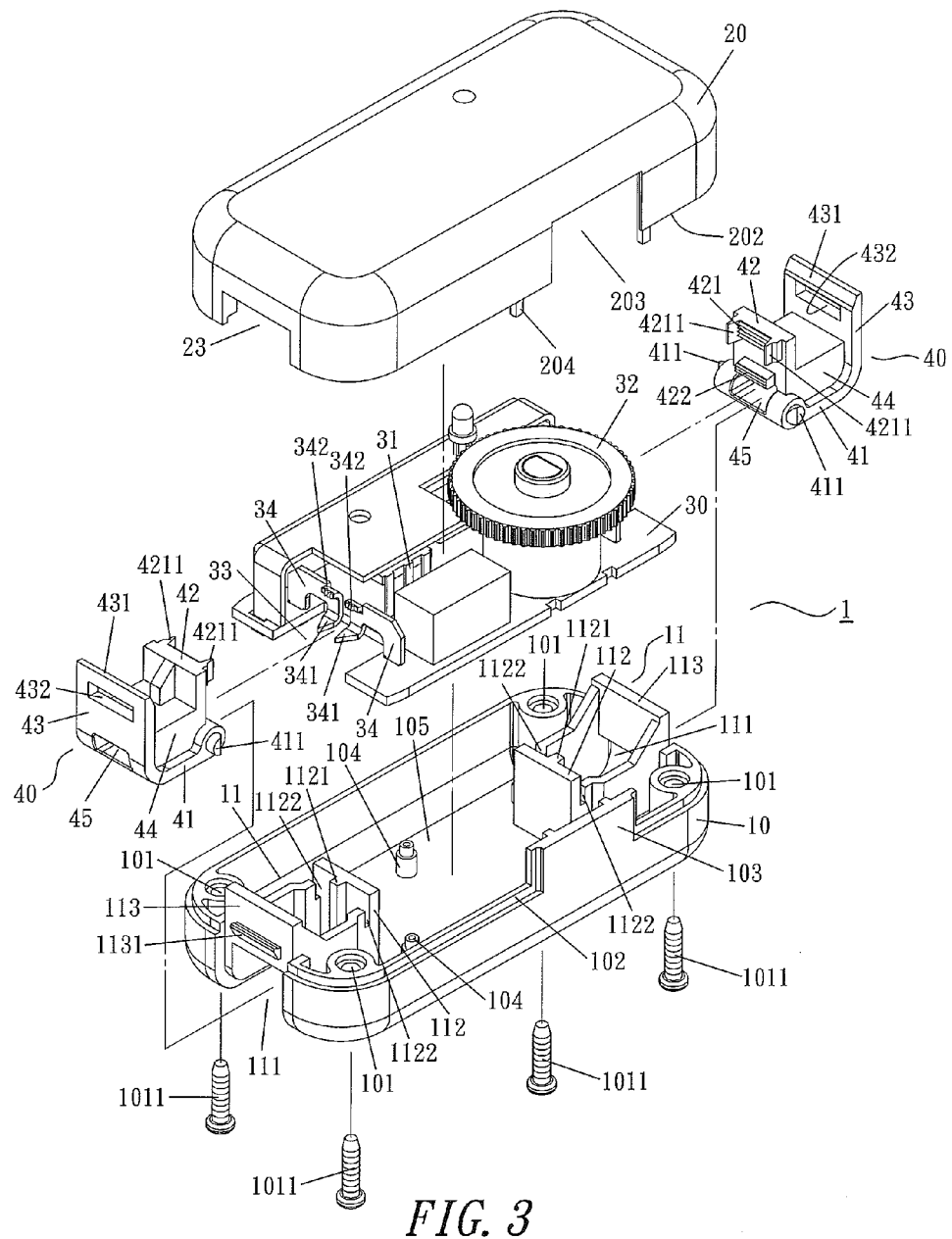
FIG. 3 is an exploded view of a preferred embodiment of this disclosure.
Figure 4:
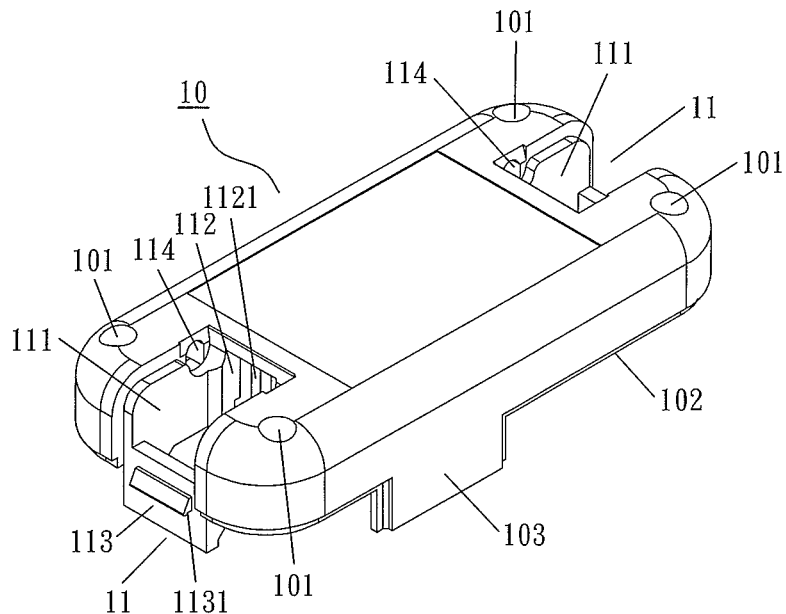
FIG. 4 is a bottom view of a seat of a preferred embodiment of this disclosure.
Figure 5:
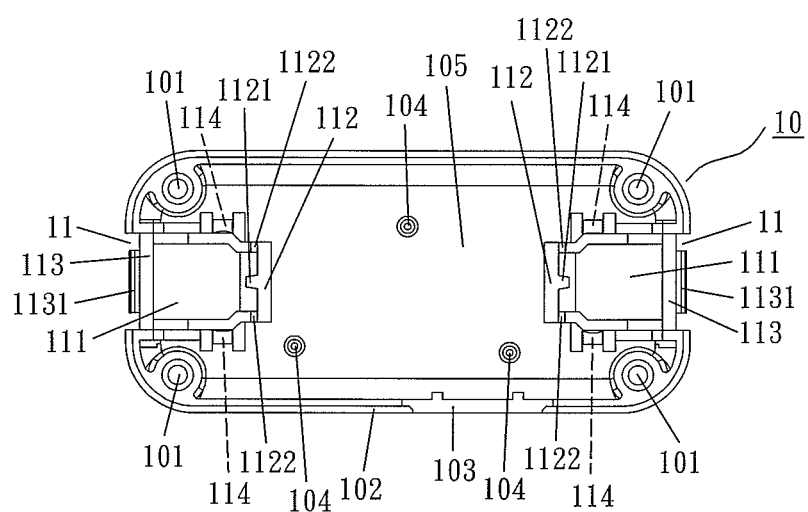
FIG. 5 is a top view of a seat of a preferred embodiment of this disclosure.

In FIGS. 1 to 5, the base 10 is a casing having a hollow formed at the top, a through hole 101 penetrated from top to bottom and formed at each of the four of the base 10 for passing an engaging member 1011 (such as a bold) from bottom to top, a stepped surface 102 having the height on the inner side greater than the height on the outer side and formed at the periphery of the base 10, a positioning plate 103 risen from a position of the base 10 and a plurality of support pillars 104 (such as three support pillars disposed at three different positions) and a large accommodating space 105 is formed; a pivoting frame 11 is formed at each of the left and right ends of the base 10, and the interior of the pivoting frame 11 is penetrated from top to bottom and passed out from an outer side to form an accommodating space 111, and a separating ridge 1121 is formed at the center of an inner surface of the inner sidewall member 112 and extended from top to bottom and has a retaining slot 1122 formed separately on both sides, and a latching ridge 1131 is transversally formed on an outer side of the outer sidewall member 113, and a pivoting slot 114 is formed on the bottom connected adjacent to both sidewalls of the inner sidewall member 112 (as shown in FIG. 4).

Figure 6:
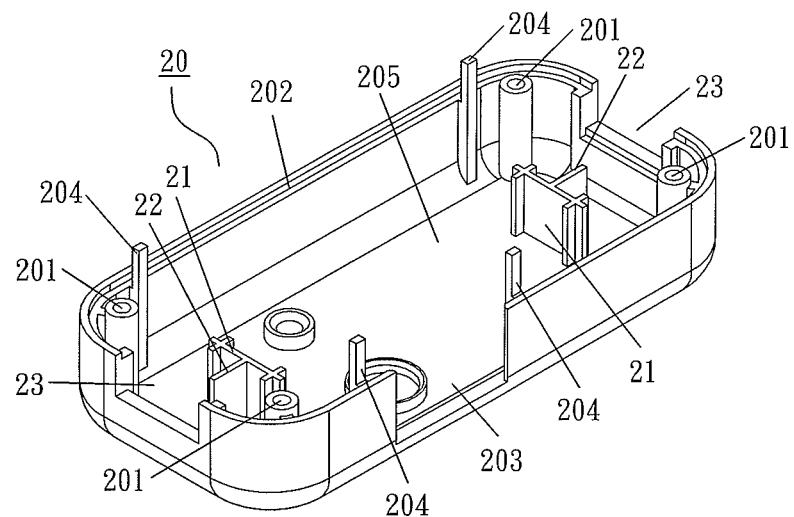
FIG. 6 is a top view of a cover of a preferred embodiment of this disclosure.

In FIGS. 1 to 3 and 6, the cover 20 is a casing having a hollow formed at the bottom of the casing, and a locking hole pillar 201 with a hollow facing downward and an inner thread formed therein is disposed at each of the four corners of the cover 20 (as shown in FIG. 6), and the locking hole pillar 201 is configured to be corresponsive to the through hole 101 of the base 10 and a stepped surface 202 having the height on the outer side greater than the height on the inner side is formed at the periphery and configured to be corresponsive to the stepped surface 102 of the base 10, and a hollow positioning slot 203 is formed at a position corresponsive to the positioning plate 103 of the base 10 and includes a plurality of positioning pillars 204 disposed therein and a large accommodating space 205 is formed; a partition wall 21 is formed separately at a position closed to the left and right ends of the cover 20, and a separating ridge 22 is extended outwardly from the center of an outer side of the partition wall 21, and an installing notch 23 is formed on a distal surface of the left and right ends of the cover 20 separately.

Figure 7:
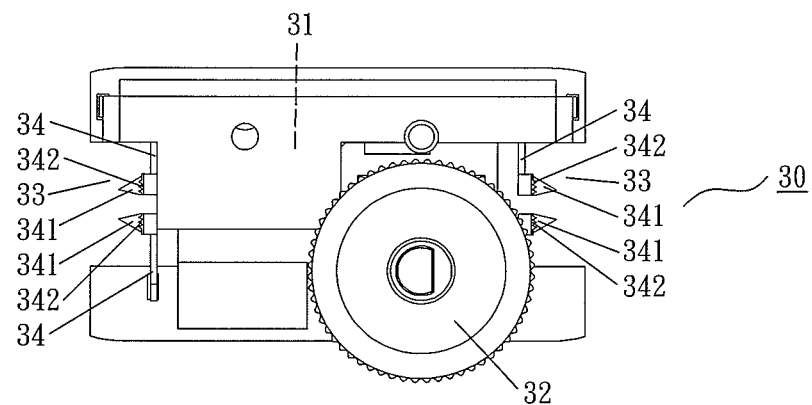
FIG. 7 is a top view of a printed circuit board of a preferred embodiment of this disclosure.

In FIGS. 3 and 7, the printed circuit board 30 includes a switch, a dimming circuit 31 and a knob 32, wherein the switch and the dimming circuit 31 are electrically coupled to the knob 32. If the knob 32 is turned, the switch and the dimming circuit 31 will be turned on and off to provide a dimming effect at the ON and OFF statuses. As to the position, the knob 32 is situated at a position higher than the printed circuit board 30, and an outer edge of the knob 32 is protruded further than the edge of the printed circuit board 30 (as shown in FIGS. 1 and 7); an accommodating recess 33 is formed separately at the left and right ends of the printed circuit board 30 and preferably large enough to frame the pivoting frames 11 on both sides of the base 10, and a plurality of conductive plates 34 disposed above the accommodating recess 33 and electrically coupled between the switch and the dimming circuit 31, and a conductive tip 341 is formed and extended outwardly from an inner side of the conductive plate 34, and a conductive sharp-claw plate 342 is formed at the top of the conductive tip 341.

Figure 8:
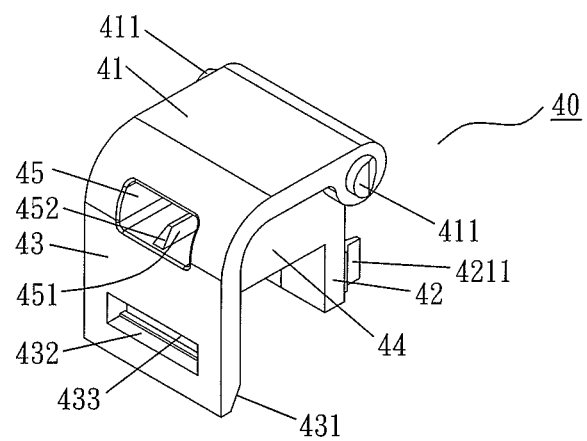
FIG. 8 is a bottom view of a wire holder of a preferred embodiment of this disclosure.
Figure 9:
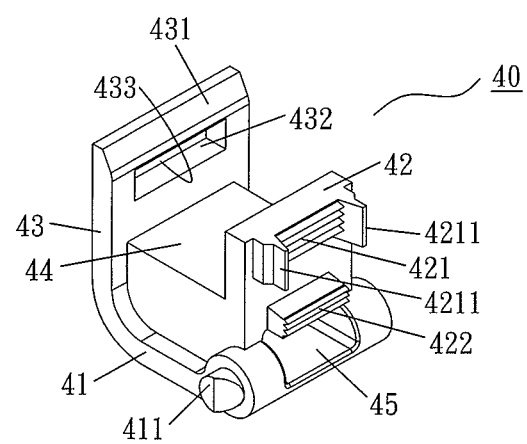
FIG. 9 is a bottom view of a wire holder of a preferred embodiment of this disclosure.

In FIGS. 1 to 3 and 8 to 9, there are two wire holders 40 disposed symmetrically sideway with respect to each other, and a pivoting shaft 411 is extended out from an inner end of the bottom wall 41 of each wire holder 40 and has a bevel to facilitate rotating the pivoting slot 114 of the base 10 to define a pivoting status, and an inner sidewall member 42 is coupled to the top of the pivoting shaft 411 and an upper assistant pressing plate 421 and a lower assistant pressing plate 422 are disposed on an inner side of the inner sidewall member and separated from one another, and a limit plate 4211 is installed on each of both sides of the upper assistant pressing plate 421; an outer sidewall member 43 is extended outwardly from an outer side of the bottom wall 41, and the inner top edge of the outer sidewall member 43 is formed into a bevel 431 and a through hole 432 is formed at the bottom of the outer sidewall member 43 and provided for applying a force to turn and shift the wire holder 40, and the inner top edge of the through hole 432 is formed into a latching edge 433; a block 44 is coupled between the inner sidewall member 42 and the outer sidewall member 43 and an insert hole 45 is penetrated through the interior of the block 44 and formed between the inner sidewall member 42 and the outer sidewall member 43; and a separating ridge 451 is formed on an inner side of the insert hole 45, and the outermost distal head of the separating ridge 451 is formed into a bevel 452 (as shown in FIGS. 1 and 8).

In an assembling process, the printed circuit board 30 is installed horizontally in the large accommodating space 105 of the base 10, and the accommodating recesses 33 on both sides of the printed circuit board 30 frame the pivoting frames 11 on both sides of the base 10 respectively, while the conductive plates 34 are inserted into the corresponsive retaining slots 1122 for positioning, so that a gap between the two conductive plates 34 on the same side drops along the separating ridge 1121 of the base 10 (in other words, the separating ridge 1121 separates the two conductive plates 34 on the same side). In the meantime, the bottom side of the printed circuit board 30 sits on the support pillars 104 stably for positioning. Now, the outer edge of the knob 32 will be disposed at the top of the positioning plate 103 risen from the base 10 without being contacted with the positioning plate 103.

The pivoting shafts 411 of the wire holders 40 on both sides are rotated into the pivoting slots 114 on both sides of the base 10 respectively, so that the wire holders 40 is situated in a status of pivoting with the base 20 by using the pivoting shaft 411 as an axis. Now, the latching edge 433 of the wire holders 40 is still not latched with the latching ridges 1131 of the base 10, so that the wire holder 40 droops naturally due to the effect of gravitational force.

Finally, the stepped surface 202 of the cover 20 is configured to be corresponsive to the stepped surface 102 of the base 10, and the positioning slot 203 is configured to be corresponsive to the positioning plate 103 of the base 10, and the locking hole pillar 201 is configured to be corresponsive to the through hole 101 of the base 10, and the installing notch 23 is configured to be corresponsive to the outer sidewall member 113 of the base 10. The cover 20 is covered and engaged to the base 10. Now, the positioning slot 203 of the cover 20 encloses the protruding position of the knob 32 without being contacted with the knob 32. In other words, the knob 32 has a portion protruded out from the range of engaging the cover 20 and the base 10. In the meantime, the positioning pillar 204 in the cover 20 abuts a surface of the printed circuit board 30 for positioning, and the partition wall 21 and the separating ridge 22 in the cover 20 are suspended downwardly. Finally, the engaging members 1011 (such as a bold) is passed from bottom to top through the through hole 101 of the base 10 and locked with the locking hole pillar 201 of the cover 20 to complete assembling the whole online knob dimming switch 1.

When use, the wire holders 40 at both ends of the online knob dimming switch 1 are provided for connecting a power cable which is formed by combining two wires, and each wire includes a conductive wire bundle disposed in the wire and insulating plastic coating coated on the exterior of the conductive wire bundle. During the manufacturing process, the insulating plastic coating of the two wires are glued with one another, so that a small section of the starting ends of the two wires may be torn away to facilitate peeling off a small section of the insulating plastic coating to expose the conductive wire bundle to form a bare end, and allowing users to connect the bare end with the wire holder. It is a prior art to process the end of the wire to form the bare end, but this disclosure needs not to process the end of the wire to form the bare end and just connects the wire to a power supply directly.

Figure 10:
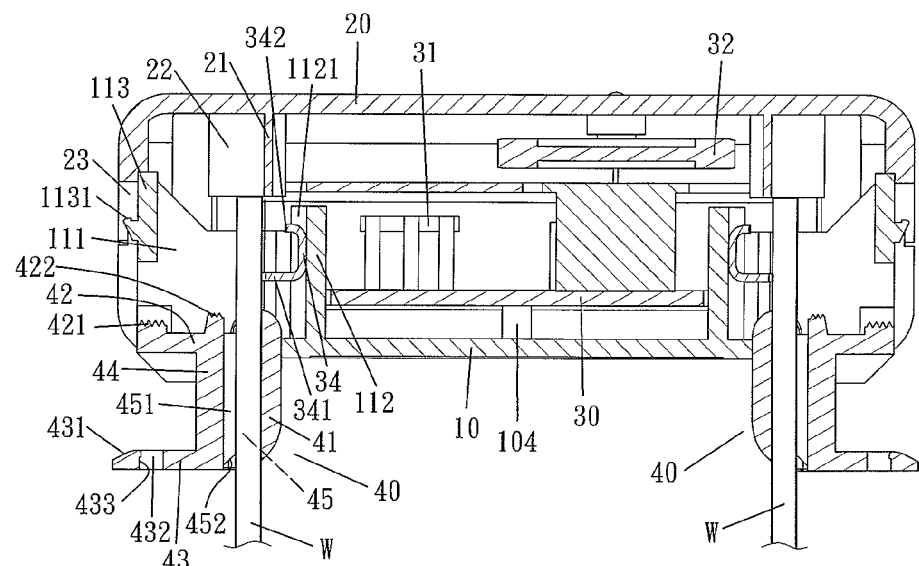
FIG. 10 is a front view of connecting a power cable to a wire holder of a preferred embodiment of this disclosure.

With reference to FIG. 10 for an electric connection, when the wire holders 40 are suspended naturally, the power cable w (or two wires) is inserted from bottom to top (or from outside to inside) through the insert hole 45 of the wire holders 40. Firstly, the two wires of the power cable w glued with one another will touch the bevel 452 at the outermost end of the separating ridge 451 in the insert hole 45 and will be cut, so that only the two wires will move forward. Now, the separating ridge 451 has the effect of separating the two wires of the power cable w, and the two wires of the power cable w are extended upward until the ends of the wires abut the partition wall 21 and separating ridge 22 of the cover 20. Now, the conductive tips 341 of the conductive plates 34 are aligned precisely with an outer wall of a wire, but have not pierced the outer wall of the wire.

Figure 11:
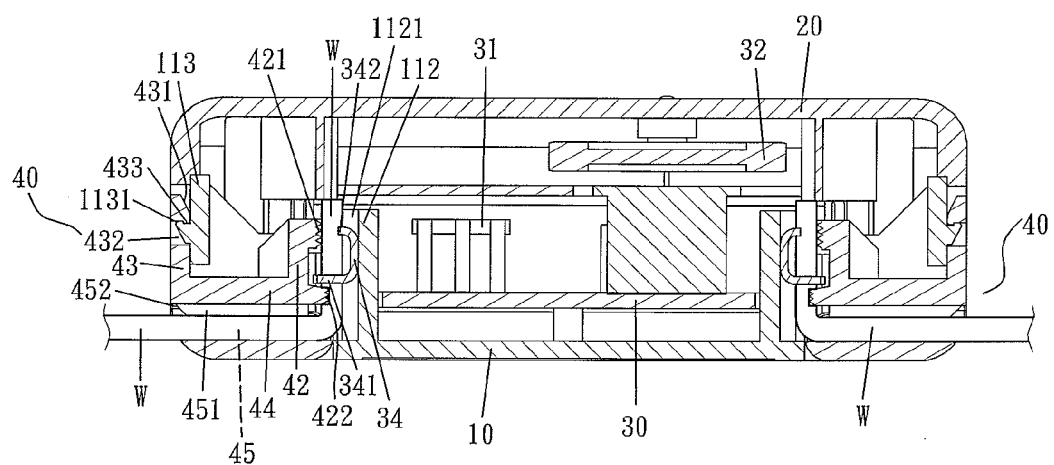
FIG. 11 is a front view of a power cable connected to a wire holder of a preferred embodiment of this disclosure.
Figure 12:
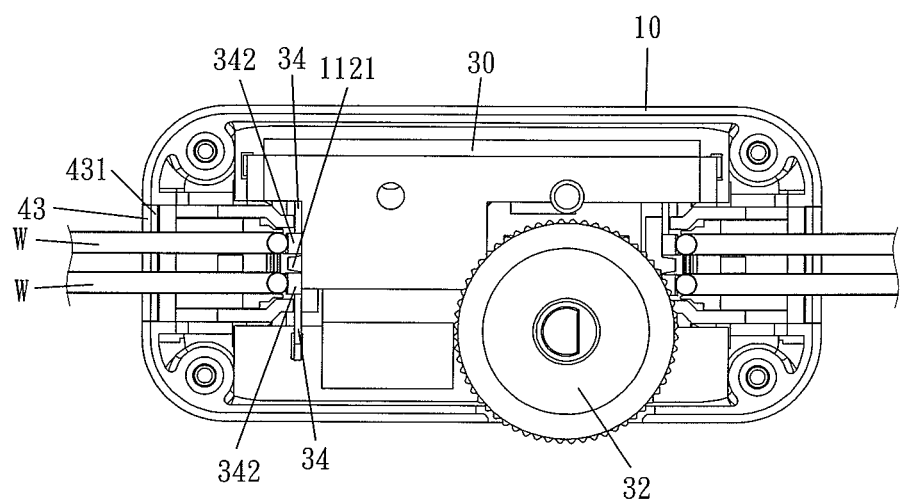
FIG. 12 is a bottom view of a power cable connected to a wire holder of a preferred embodiment of this disclosure.

In FIGS. 11 and 12, the wire holder 40 is shifted upward by using the pivoting shaft 411 as an axis until the latching edge 433 of the wire holder 40 is latched with the latching ridge 1131 of the base 10. In this process, the wire holder 40 will drive the power cable w to deviate or shift altogether, or the wire remained in the insert hole 45 may be deviated with the insert hole 45 and changed from an erected status to a horizontal status. The wire entered into the accommodating space 111 of the base 10 will be displaced towards the inner side with the wire holder 40, and in contact with the upper assistant pressing plate 421 and the lower assistant pressing plate 422 of the wire holder 40 due to deviation to push the wires of the power cable w to shift towards the inner side. During this process, the limit plates 4211 on both sides of the upper assistant pressing plate 421 will guard the two wires of the power cable w, and the separating ridge 1121 of the base 10 will separate the two wires of the power cable w, and the conductive sharp-claw plates 342 of the conductive plates 34 will hold the corresponsive wires respectively. Most importantly, the two wires of the power cable w touch the corresponsive conductive tips 341 of the conductive plates 34 during the process of shifting towards the inner side, so that when the conductive tips 341 remain still, the wires are forced to shift towards the inner side, and the conductive tips 341 will pierce the insulating plastic coating of the wire, so as to achieve the effect of electrically connecting the conductive wire bundle of the wire.

The wire holders 40 at both ends of the online knob dimming switch 1 are provided for connecting a power cable, and one of the ends of the power supply is connected to the lampholder, and the other power cable is connected to a power supply (such as the mains power). Therefore, the power is entered into the online knob dimming switch 1 from the connected wire holder 40, and the switch, the dimming circuit 31, and the knob 32 of the printed circuit board 30 are provided for achieving the dimming effect to adjust the light emitting brightness of the dimmable energy-saving fluorescent bulb or the dimmable LED bulb connected to the lampholder.

From the description above, this disclosure mainly includes the switch and the dimming circuit installed on the printed circuit board of the online knob dimming switch and operated with the dimmable energy-saving fluorescent bulb and the dimmable LED bulb, so that the dimmable energy-saving fluorescent bulb and the dimmable LED bulb of the lampholder can be installed and used directly to achieve the effect of adjusting the light emitting brightness of the dimmable energy-saving fluorescent bulb and dimmable LED bulb installed to the lampholder directly by the online knob dimming switch. In addition, this disclosure has the effect of connecting the electric wires to the wire holders conveniently, so as to achieve the effects of shortening the assembling procedure and improving the assembling efficiency and the market competitiveness.

In summation, this disclosure achieves the expected functions and effects, and the detailed description of the preferred embodiments to enable persons having ordinary skill in the art to implement this disclosure. While this disclosure has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An online knob dimming switch, comprising a base, a cover, a printed circuit board and a plurality of wire holders, characterized in that the base is a casing with a hollow formed at the top of the base, a large accommodating space formed inside the base, a pivoting frame formed separately at left and right ends of the base, an accommodating space penetrating from top to bottom in the pivoting frame and passing out from an outer side of the base, a separating ridge formed at the center of a surface of an inner sidewall member and extended from top to bottom, a retaining slot formed separately on both sides, a latching ridge transversally disposed on an outer surface of the outer sidewall member, and a pivoting slot formed at the bottom edge of the inner sidewall member; the cover is a casing with a hollow formed at the bottom of the cover and covered and engaged with the base, and a large accommodating space is formed therein, and a partition wall is formed at a position separately and slightly closer to the left and right ends, and a separating ridge outwardly extended from the center of an outer side of the partition wall, an installing notch formed on an end surface of the left and right ends of the cover separately, and the printed circuit board has a switch and dimming circuit and a knob installed thereon, and the switch and the dimming circuit are electrically coupled from the knob, and the knob is disposed at a position higher than the printed circuit board, and the outer edge of the knob is protruded further than an edge of the printed circuit board, and an accommodating recess is formed at the left and right ends of the printed circuit board and large enough to frame the pivoting frame on both sides of the base, and a conductive plate is installed above the accommodating recess and electrically coupled between the switch and the dimming circuit, and a conductive tip is formed and extended outwardly from an inner side of the conductive plate, and a conductive sharp-claw plate is formed at the top of the conductive tip; the printed circuit board is installed horizontally into the large accommodating space of the base, and the accommodating recesses on both sides frame the pivoting frames on both sides of the base respectively, and the conductive plates are inserted into the corresponding retaining slots for positioning, and the separating ridge separates the two conductive plates disposed on the same side, and an outer edge of the knob is disposed at the top of the positioning plate risen from the base; and the plurality of wire holders with a quantity of two are installed symmetrically sideway, and a pivoting shaft is extended out from the inner side of the bottom wall of each wire holder towards both sides to enter into the pivoting slot of the base to define a pivoting status, and an inner sidewall member is disposed at the top of the pivoting shaft and has an upper assistant pressing plate and a lower assistant pressing plate disposed at upper and lower positions of an inner side of the inner sidewall member; an outer sidewall member is extended upwardly from an outer side of the bottom wall and has an inner edge as a latching edge; a block is coupled between the inner sidewall member and the outer sidewall member and an insert hole is formed and penetrated between the inner sidewall member and the outer sidewall member; and a separating ridge is formed on an inner side of the insert hole.

2. The online knob dimming switch according to claim 1, wherein the base has a through hole formed at each of the four corners of the base and penetrated from top to bottom for passing the engaging member from bottom to top, and a stepped surface with the height on the inner side greater than the height on the outer side and formed at the periphery of the base, and a positioning plate risen from the base; a locking hole pillar having a hollow facing downward and an inner thread formed therein is disposed at each of the four corners of the cover, the locking hole pillar is configured to be corresponsive to the through hole of the base and has a stepped surface with the height on the outer side greater than the height on the inner side and formed at the periphery and configured to be corresponsive to the base, and a hollow positioning slot is formed at a position corresponsive to the positioning plate of the base, and the cover includes a plurality of positioning pillars disposed therein; and the stepped surface of the cover is configured to be corresponsive to the stepped surface of the base, while the positioning slot of the cover is configured to be corresponsive to the positioning plate of the base, and the locking hole pillar of the cover is configured to be corresponsive to the through hole of the base, and the installing notch of the cover is configured to be corresponsive to the outer sidewall member to cover and engage with the base, so that a portion of the knob is protruded from the range of engaging the cover and the base, while the positioning pillar disposed in the cover abuts a surface of the printed circuit board for positioning, and then the engaging members are passed from bottom to top through the through hole of the base and locked with the locking hole pillar of the cover.

3. The online knob dimming switch according to claim 1, wherein the base has a plurality of upwardly protruding support pillars, and when the printed circuit board is horizontally placed into the large accommodating space of the base, the bottom side of the printed circuit board sits on the support pillars stably for positioning.

4. The online knob dimming switch according to claim 1, wherein the pivoting shaft of the wire holder has a bevel to facilitate entering the base into a pivoting slot of the base by a rotary motion pivoting slot.

5. The online knob dimming switch according to claim 1, wherein the assistant pressing plate of the wire holder has a limit plate disposed separately on both sides of the assisting pressing plate.

6. The online knob dimming switch according to claim 1, wherein the inner top edge of the outer sidewall member of the wire holder is formed to be a bevel and a though hole is formed at the bottom of the wire holder.

7. The online knob dimming switch according to claim 6, wherein the latching edge on the outer sidewall member of the wire holder is formed at the inner top edge of the through hole.

8. The online knob dimming switch according to claim 1, wherein the insert hole of the wire holder has a separating ridge formed on an inner surface of the insert hole and an outermost distal head formed to be a bevel.

* * * * *